March 6, 1945.　　　J. T. JANETTE　　　2,370,964

SHAFT SEAL

Filed Oct. 12, 1942

Inventor
John T. Janette
By Glenn S. Noble
Atty

Patented Mar. 6, 1945

2,370,964

UNITED STATES PATENT OFFICE 2,370,964

SHAFT SEAL

John T. Janette, Kenilworth, Ill., assignor to Janette Manufacturing Company, Chicago, Ill., a corporation of Illinois Application October 12, 1942, Serial No. 461,753

1 Claim. (Cl. 286—7)

This invention relates to seals intended for retaining liquid or fluid from escaping from machines employing rotary shafts, and is particularly adapted for use where there may be pressures greater than atmospheric pressure.

The objects of this invention are to provide an improved seal or retaining device which will be simple in construction and durable and efficient in operation and which may be readily applied to a shaft and its housing without any special finishing or fitting operations; to provide a shaft seal embodying a sealing element which will have universal movement with respect to the shaft in order to maintain a close sealing contact therewith; to provide means whereby the sealing element may be supported for relatively free movement and will be packed or sealed between the element and its supporting means, and in general, to provide an improved seal of the character indicated which will be described more fully hereinafter.

Figure 1:
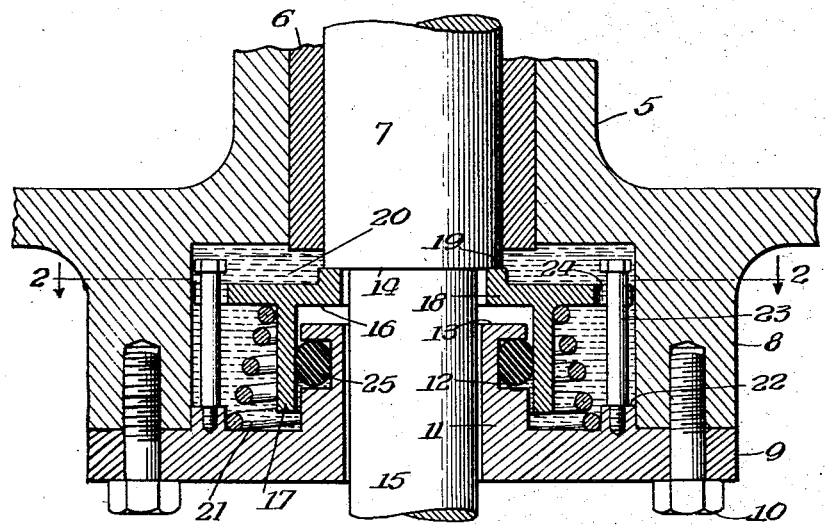
Figure 2:
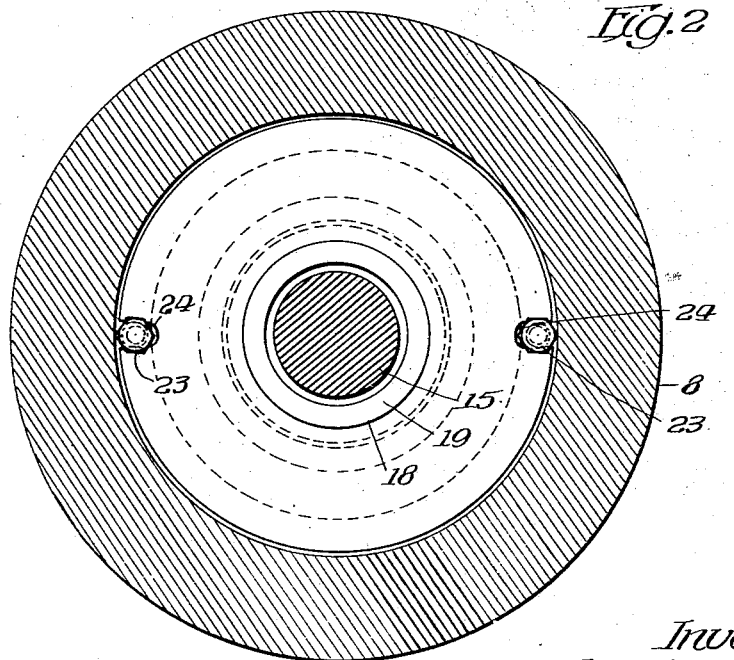

In the accompanying drawing illustrating this invention,

Fig. 1 is a cross sectional view representing a portion of a machine in which a shaft is mounted, showing my improved seal in operative position; and Fig. 2 is a cross sectional view taken substantially on the line 2—2 of Fig. 1.

Seals of this character are used for a large variety of machines, and in the drawing, 5 indicates the body portion or frame of a machine such as a pump, compressor or gear casing having a bearing 6 for a shaft 7. The frame or casing 5 has a boss or housing 8 around the bearing, which is closed by means of a cap or cover 9 held in position by bolts or cap screws 10. This cap has an inwardly extending cylindrical projection or hub 11 having a peripheral groove 12 and an end flange 13.

The shaft has a sealing portion 14 which may comprise a ring or part fixed to the shaft or which may be a shoulder or abutment formed by having the end portion 15 of the shaft reduced as shown. Rotary shafts of the character indicated frequently have a limited longitudinal movement or play and may also have radial movement so that it is desirable to have the sealing members arranged to allow for such movements while maintaining a tight sealing relation with the shaft. I accomplish this by means of a sealing member or element 16 which coacts with the shoulder or abutment 14 and has a cylindrical portion 17 which extends outwardly over the hub 11, but has sufficient space or clearance so that it may move freely with respect to the hub. The cylindrical portion 17 is formed integrally with a disc 18 which has a portion such as an annular projection or ring 19 that engages with the shoulder 14 to form the running seal. I have found that in actual operation, the surfaces of these coacting sealing parts become very smooth and are apt to have a mirror finish thus forming a tight joint to prevent the passage of oil or fluid as indicated at 20. The bore of the flange portion 19 is sufficiently larger than the diameter of the shaft to permit free movement of such ring or sealing member. The sealing member or element 16 is pressed inwardly or urged against the abutment on the shaft by any suitable resilient means such as a spring 21 which is interposed between the sealing member and the cap 9. This spring is preferably of conical form, the larger end of which engages with the cap and is held in central position by means of a flange 22. Its smaller inner end fits over the cylindrical portion 17 so that the spring tends to hold the sealing member 16 in axial position as well as to urge it against the shoulder 14. Any suitable means may be provided to prevent rotation of the sealing member 16 as, for instance, the pins 23 which are fixed in the cap 9 and project through guide slots 24 in the disc 18.

A sealing ring or gasket 25 which may be made of any suitable material as, for instance, rubber, artificial rubber, or other like resilient substance, is positioned in the slot 12 and makes a tight closure between the hub 11 and the cylindrical portion 17 of the sealing member. This ring may be of any suitable cross section to effect such closing or sealing between the adjacent parts, and also to hold the sealing member in substantially axial alignment with the shaft. With this arrangement, the sealing member 16 will have free movement both longitudinally and transversely, or in other words, will have such a universal movement that the engaging portion or flange 19 is free to follow the coacting surface 14 of the shaft regardless of slight misalignment of the shaft or longitudinal movement of the same.

If the oil or fluid which is to be retained in the frame or casing 5 is under substantial pressure, such pressure against the sealing member 16 will be nearly balanced and a comparatively light spring will be sufficient to hold the sealing member against the abutment 14. The fluid is free to pass the open end of the cylindrical portion 17 and into the groove 12 where it presses the ring 25 closely against the adjacent parts and thus the ring prevents the passage of fluid and effectively holds the fluid from escaping even if it is under relatively high pressure.

My improved seal is substantially self-contained and requires no accurate or tight fitting of the sealing parts with the inner wall of the boss or housing 8. The various parts of the seal may be mounted on the plate or cover 9 and the heads of the screws or pins 23 will serve to hold the parts together preparatory for placing the seal in operative position.

I have shown and described a simple and efficient form of the invention which is adapted to be used for sealing the shafts of various kinds of machines or machine elements, but changes may be made in the design or construction of the same in order to adapt the seal to different shafts or machines and therefore I do not wish to be limited to the particular construction herein shown and described except as set forth in the following claim:

In a pressure seal, in combination, a housing having a recess therein, a shaft mounted in said housing and extending into the recess and having a sealing abutment within the recess, a cap for said recess, means for securing the cap to the housing, a cylindrical projection extending from the cap into the recess, which fits freely over the shaft and having a peripheral groove therein, a cylindrical sealing member having one end engaging with the abutment on the shaft to form a seal and extending freely over the cylindrical projection with its outer end open, a resilient ring in said groove which engages the inner surface of the cylindrical sealing member to close the space therebetween and to hold the sealing member so that it may have a substantially universal movement, a spring urging the sealing member against said abutment, and means for holding the sealing member in operative relation to the cap, the arrangement being such that pressure of fluid in the recess will react against the sealing ring and increase its pressure against the adjacent parts.

JOHN T. JANETTE.